United States Patent Office 2,939,135
Patented May 31, 1960

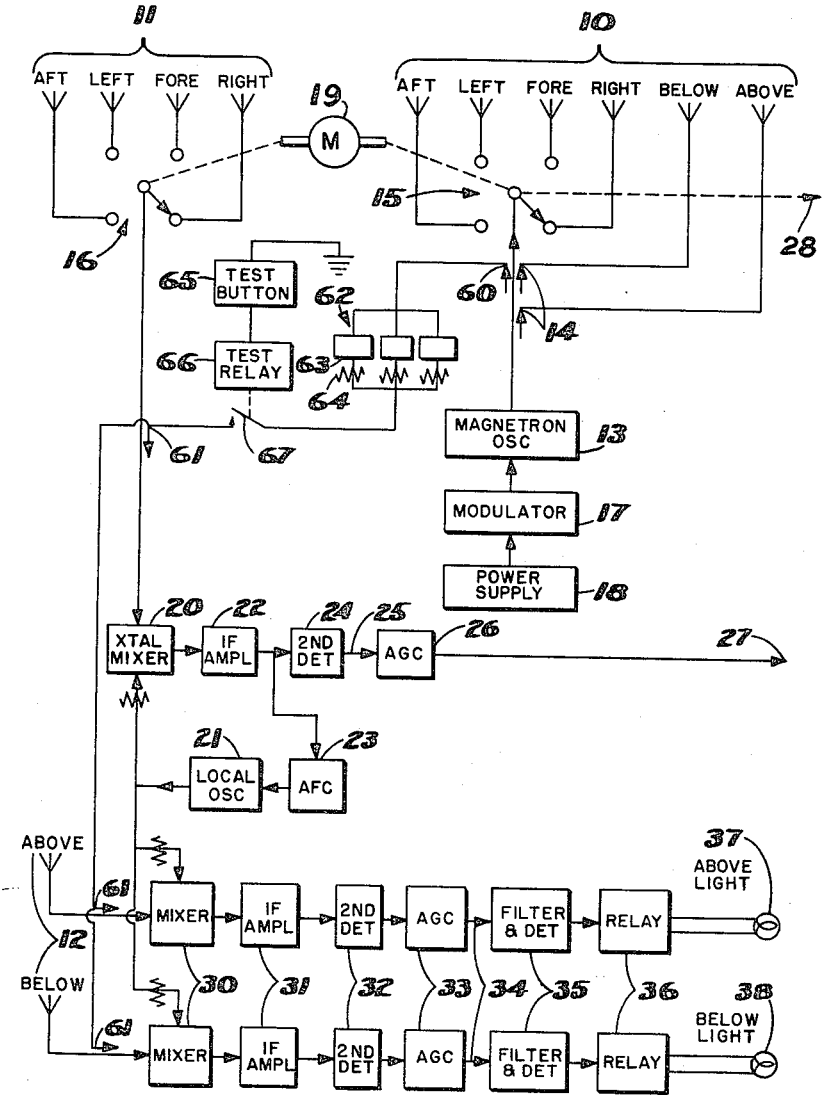

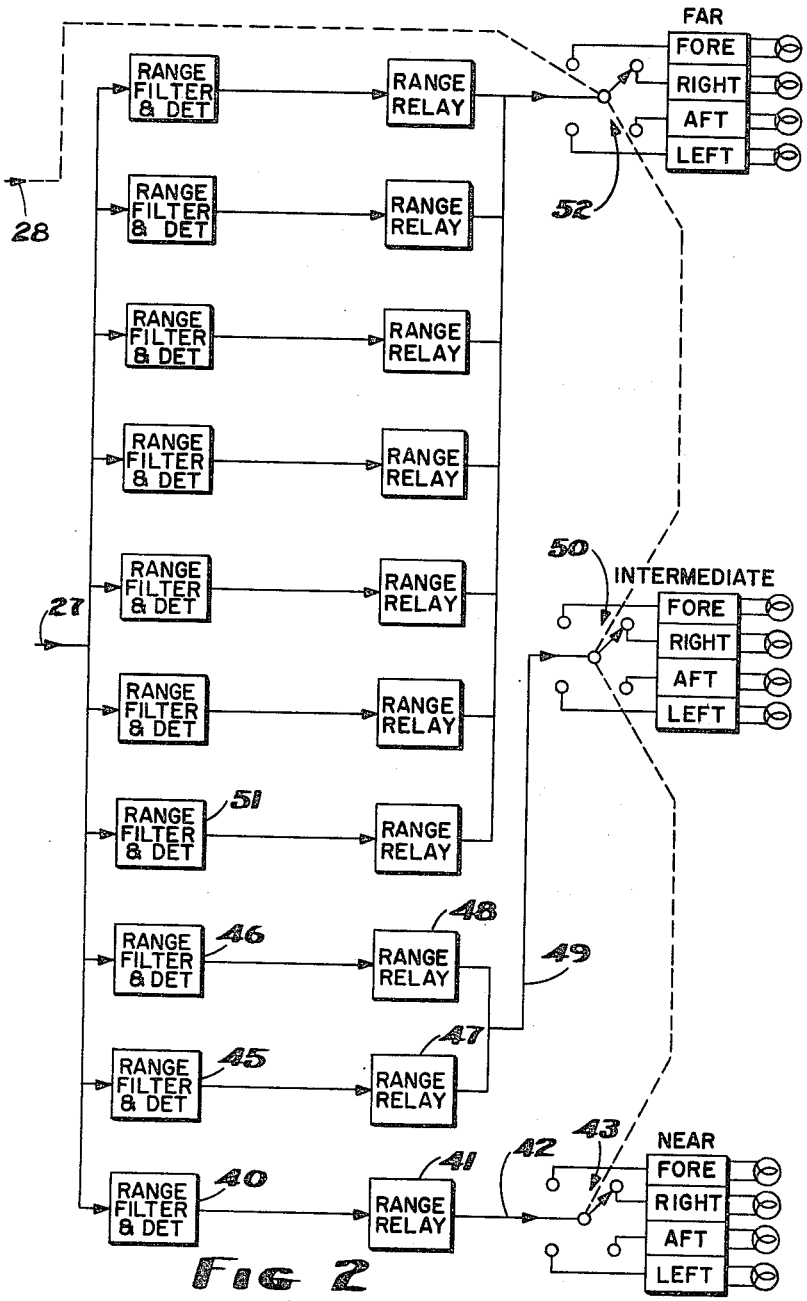

2,939,135

AIRCRAFT PROXIMITY WARNING SYSTEM WITH INCORPORATED TESTING SYSTEM

John F. Beckerich, Dallas, and Kenneth W. Hannah, Richardson, Tex., assignors to Collins Radio Company, Cedar Rapids, Iowa, a corporation of Iowa Filed Oct. 8, 1956, Ser. No. 614,513

7 Claims. (Cl. 343—14)

This invention relates to radar systems and more particularly to omni-directional proximity-warning radar systems.

Prior art radar systems for warning aircraft personnel of other approaching aircraft have involved pulse systems with a limited coverage of the sphere about the aircraft. In view of increasing aircraft in traffic lanes and the possibility of collision from any direction, a proximity warning is desirable for safe air travel. Further, the system used in this type of operation must not only have useful indications of the presence of other aircraft, but must be capable of self-testing so as to insure operability when and as needed.

Accordingly, it is an object of this invention to provide a proximity warning system having a full-spherical sensitivity.

It is an object of this invention to provide a proximity warning system capable of indicating the presence of any number of proximate objects.

It is a further object of this invention to provide a self-testing radar system which test includes as much of the system without adding undue complication to the host aircraft.

It is a feature of this invention that a plurality of switched antennas are utilized to obtain a full-spherical coverage.

It is a further feature of the invention that a continuously emitted frequency-modulated carrier is radiated, permitting the necessary minimum range for successful operation. Further, testing of the system by simple, passive circuits within the aircraft connecting the transmitting and receiving antenna is readily achieved.

It is an additional feature of this system that the Doppler-shift due to speed is minimized as an error in the range signal and any error thus resulting tends to show the object closer than in actuality.

Further objects, features, and advantages of the invention will become apparent from the following description and claims when read in conjunction with the drawings in which:

Figure 1 shows a portion of the system including the transmitting and receiving equipment, and Figure 2 shows the remainder of the receiving equipment as to horizontal quadrant information.

In Figure 1 a schematic of the transmitting system and a portion of the receiving system is illustrated in block form. Six transmitting antennas 10, grouped together for convenience of illustration, are mounted on the craft so as to have the radiation patterns as labeled. The aft, fore, left, and right antennas have the radiation characteristics of a thin fan covering approximately a quadrant in the horizontal plane with a slight spread in the vertical direction. The above and below antennas have substantially a hemispherical coverage and are mounted on parts of the craft relatively, for radiation in those directions. Receiving antennas having the same coverage of the sphere about the craft are mounted near the transmitting antennas. The horizontal quadrant antennas 11 and the above and below antennas 12 are connected to their respective receiving systems.

In order to reduce excessive feedover between transmitting and receiving antennas, the polarization of the transmitting antennas is restricted to one orientation and the polarization of the correlated receiving antennas is crossed with respect to the transmitting antenna. This is to say, the polarization of the receiving antenna is ninety degrees in space rotation from the orientation of the transmitting antenna. While this lowers the sensitivity of the system slightly, it provides a sufficient reduction in the feedover or leakage from the transmitter to receiver and permits greater receiver sensitivity relative to leakage signal overloading. Another important reason for cross polarization is that the signal return from intervening rainfall is much less than the return signal from a desired target. That is, the rain becomes transparent and reduces interference of target detection.

The above and below transmitting antennas are connected to the radio frequency power source 13 by means of couplers 14. The above and below antennas, both receiving and transmitting, are thus connected directly to the receiving and transmitting systems, respectively, without intervening switches or other equipment.

The horizontal quadrant antennas are connected to the radio frequency power source 13 by means of a cyclic switch 15. Switch 15 is driven by motor 19 and connects each of the horizontal quadrant antennas to the transmitter for a predetermined percentage of the scanning cycle. A desirable switching cycle is two seconds, permitting one-half second per quadrant. The receiving horizontal-quadrant antennas 11 are switched by a switch 16 which is also driven by motor 19 and thus is synchronous with switch 15.

As noted before, the above and below receiving antennas 12, corresponding to the counterpart transmitting antenna, are not switched but are connected directly to the respective receiver channels.

Where horn antennas are utilized with square waveguide as the starting section of the horn, the transmitting and receiving antennas 10 and 11 may be cross-polarized probes in the waveguide sections. This permits a reduction in the number of antennas in that a single radiating array can be used by both receiving and transmitting channels. This further permits the identical field patterns for both transmitting and receiving functions.

In the transmitting section the radio frequency power source is a magnetron oscillator, in view of the very high frequencies used. The oscillator is continuously oscillating and is controlled as to frequency by a modulator 17. The modulation wave form is preferably a sawtooth frequency vs. time characteristic. Change of the frequency of the radio frequency power source at a linear rate permits simplification of the filter and relay circuits in the receiving system. In airborne systems the aircraft alternating power supply 18 is used as a reference frequency for the repetition rate of the modulating saw-tooth.

In the receiving system the tap of switch section 16 is connected to a mixer 20. At the frequencies involved, the mixer is usually a crystal diode. A local oscillator 21 supplies a local frequency for heterodyning the received signal and the transmitter leakage signal to an intermediate frequency. This pair of intermediate frequencies is amplified by the intermediate frequency amplifier 22. The output of this amplifier is applied to an automatic frequency control 23 connected to the local oscillator 21 for stabilization of the frequency thereof. The output of the intermediate frequency amplifier 22 is also connected to a second detector 24 which heterodynes the received signal with the transmitter leakage signal to produce a beat-note at point 25. The signal appearing at point 25 is a tone having a frequency related to the distance of the target from the present radar system. The frequency is the identifying feature of this signal. Any amplitude variation such as arising from return signal level variation, due to range and target cross section area is considered undesirable. For this reason an automatic gain control 26 is used to provide at output 27 a relatively constant signal having the frequency or frequencies related to the target's or targets' distance. Output 27 is carried over to Figure 2 for further operation thereon in accord with the invention. Coupling 28 is carried over to Figure 2 for driving the remainder of the synchronous cyclic switches.

The above and below hemisphere receiving systems are identical and are comprised of a mixer 30, intermediate frequency amplifier 31, second detector 32, automatic gain control 33, similar to the lineup of the horizontal quadrant receiver. Local oscillator 21 is utilized in mixers 30 for the heterodyning operation. The output 34, as does output 27, contains frequencies of somewhat stabilized amplitude and of frequency or frequencies related to the distance of a target from the present system.

It is desirable to limit the maximum range of the hemisphere systems to slightly less than the difference in levels at which aircraft customarily fly. Thus two aircraft passing on their prescribed altitudes for different headings will not sense each other with their systems. A minimum range is desirable to prevent wing tips, tail tip, etc. from providing a warning signal. Therefore, frequencies in the band defined by the maximum and minimum range must be sensed. Thus, a filter having the prescribed passband will permit frequencies related to signals between the minimum and maximum range to pass, be detected and actuate the warning system.

Filters 35 reject all other frequencies than those in the passband which are normally tones in the audible frequency range. The frequencies passed by filters 35 are detected by rectifiers connected thereto. The outputs of the detectors are connected to relays 36 which are thus actuated by tones passed by the filter 35. Upon energization, the relays connect the related warning light to the power source to illuminate the warning.

Thus, if a target is in the above hemisphere, the frequency-modulated wave emitted by the above antenna 10 is returned by the target, having a time delay to the above antenna 12. This signal and the transmitter leakage signal are heterodyned, detected by second detector 32, yielding a voltage having a frequency related to the target distance, with the amplitude stabilized. When the target signal is passed by the filter and detected the relay is actuated to light the above light 37 to indicate a target both within the maximum range and above the host aircraft. A similar target below the plane within the sensitive hemisphere will light the below light 38.

In Figure 2 the received, converted, and amplitude stabilized horizontal-quadrant signals are applied to a series of range filters and detectors. These filters are tuned to pass a band of frequencies as are the filters in the above and below hemisphere receiver systems. In the horizontal directions sensitivity to a large range is desirable in congruence with the normal level flight of aircraft. There is, however, the necessity for presenting the proximity information in such a manner as to provide the greatest utility to the pilot. For this reason, three range indicators are used, near, intermediate, and far ranges. With this gradation, the approach of an aircraft can be detected and its relative proximity can be analyzed. Thus, the near range system filter has a passband similar to the above and below hemisphere receiving systems. Range filter 40 is adjusted to have a passband of frequencies to permit target signals related to ranges from the minimum range to a predetermined intermediate range, for example, from two hundred feet to eight hundred feet, respectively, pass, be detected, and applied to the range relay 41 for energizing the switch circuit 42. Here, switch 43, actuated in synchronism with switches 15 and 16, distributes the energizing voltage from circuit 42 to the light corresponding to the quadrant in which the signal was received by that antenna.

An intermediate range, for example, from eight hundred feet to six thousand feet, is deemed most appropriate. In this range, however, the use of a filter passing the frequencies corresponding to the exemplary distances would result in deterioration of the operation of the system by degradation of the signal-to-noise ratio. Consequently, the range filter and detector system for the intermediate range is split up into two frequency passbands.

Range filter 45 is adjusted to pass frequencies between one thousand cycles and fifty-five hundred cycles corresponding to the range from eight hundred feet to forty-four hundred feet, and range filter 46, the frequencies between fifty-five hundred cycles and seventy-six hundred cycles equivalent to the range from forty-four hundred feet to six thousand feet. These ranges of frequencies are exemplary and are a function of reducing the noise integral to a favorable minimum. The outputs of the two range filters actuate range relays 47 and 48, respectively. The outputs of the two relays are combined to energize line 49. A distributing switch 50, in synchronism with the other switches 15, 16, and 43, relates the energization on line 49 to the indicating light involved in accord with the reflected signal received by the receiving antennas 11.

In a similar manner, the far range signals are passed through a series of graded filters with bandpasses adjusted to give a sufficient signal-to-noise ratio for automatic detection. As exemplary of the relation, filter 51 passes frequencies between seventy-six hundred and nine thousand cycles corresponding to the distance between six thousand feet and seventy-two hundred feet. The remainder of the filters are tuned to pass approximately one thousand cycles each, since the signal-to-noise ratio gain is less valuable than the additional complication created by grading the filters exactly. The far range lamps, switched by distributing switch 52, indicate the proximity of a target in the examples given between the ranges of six thousand feet and twelve thousand feet. If the additional complication of channels were needed, the outputs of the range filters could be arranged to give more detailed information as to the ranges, such as a light for each channel to give the pilot a very close approximation of the distance, in thousands of feet, of the target or targets.

For normal operation, however, the three ranges shown are sufficient. It is to be noted that as a feature of the frequency-modulated continuous wave emission, several targets at different ranges will produce several reflected signals, which signals are superimposed and detected simultaneously to yield a number of frequencies at point 27. These frequencies are analyzed by the range filters and will actuate the proper range lights. Thus, it could be that three targets in any quadrant in the proper ranges would light all three lights at once. Since the emission, reception, and indication are all switched synchronously, three targets could be found in each of the four quadrants also. Thus, the system is not blinded by the presence of one target from sensing others. One form of display of the indicator lights may be seen in the design application of John F. Beckerich, filed September 10, 1956, Serial No. 42,885.

In view of the nature of the use of the system, a self-testing circuit is necessary. This circuit takes advantage of the frequency-modulated aspect of the radiated energy by taking energy from the transmitted signal through a directional coupler 60 and inserting it through a directional coupler 61 into the receiver line. The transfer circuit 62, between the two directional couplers, is made in conformity with the near, intermediate and far ranges utilized in the indicating system.

The voltage taken from the transmitter line by directional coupler 60 is applied to three channels, each containing a delay line 63 and an attenuator 64. The delay line causes a delay of a sufficient amount to be equivalent to a reflected signal in the range of the corresponding distance. The attenuators have not only sufficient reduction in amplitude to protect the receiver from overloading, but give a signal out equal to the minimum signal expected; this also tests the receiver sensitivity, transmitter power output, etc. of the system. The inputs and outputs of the three delay line and attenuator sequences are tied together to superimpose the three simulated signals.

A test button 65 is provided at the indicator station. The test button actuates a test relay 66 which closes the circuit between the two directional couplers at circuit 67.

Pressing the test button 65 closes the switch circuit 67. This completes the circuit from the power source 13 through the directional couplers into the receiver system. Because the delay lines provide signals having the proper time delay relative to the simulated target distance, the signals applied to the receiver will have the identical characteristics to that of an actual target signal. Pressing the test button for over one period of the synchronous switch system will cause the entire set of lights, near, intermediate, and far for fore, right, aft, and left of each group and the above and below to light up, indicating then that the system is operative. Most importantly, the indicator bulbs will be shown dead if they are. Some information as to whether or not the receiving and transmitting antennas are shorted or damaged will be rendered since the attenuators 64 are adjusted to provide a minimum level signal to the receiving channel. If either of the antenna systems are shorted or introduces some loss, this will reduce the level of signal brought to the receiver and an actual inoperativeness will be properly indicated.

Although this invention has been described with respect to particular embodiments thereof, it is not to be so limited because changes and modifications may be made therein which are within the full intended scope of the invention as defined by the appended claims.

We claim:

1. A radar proximity warning system comprising antenna means having radiation characteristics in the surrounding sphere in which proximity of reflecting targets is to be sensed, a radio-frequency power source, said power source being frequency-modulated, radio-frequency receiving means, means coupling said power source and said receiving means to said antenna means, with a minimum of coupling from said power source to said receiving means, said receiving means including means for translating received signals into tones related in frequency to said proximity, indicating means sensitive to tones within a predetermined range of frequencies, coupling means connected between said power source and said receiving means, said coupling means having attenuation and delay corresponding to the predetermined proximities of reflecting targets indicated by said indicating means, and means for making said coupling at will whereby the system indicates its operativeness on said indicating means.

2. A proximity warning indicator having a full spherical sensitivity comprising a radio-frequency power source, means for frequency-modulating said power source, a plurality of antennas having thereamong a full spherical radiation pattern, a like plurality of receiving antennas having the same characteristics, receiving means connected to said receiving antennas, beat-note detector means in said receiving means, means stabilizing the amplitude of the output of said detecting means, indicating means, said indicating means being actuated by a detector output voltage within a predetermined frequency range, a testing circuit coupling said power source to the antenna lead of said receiving means, said testing circuit having attenuation and time delay, said delay being related to the range which actuates said indicator, and means for completing said testing circuit.

3. A proximity warning indicator comprising first antenna means having fan-shaped quadrantal radiating patterns in the horizontal plane, second and third antenna means having hemispherical radiation patterns above and below said horizontal plane, frequency-modulated means for energizing said antenna means in a predetermined polarization, first, second, and third receiving means coupled to said first, second, and third antennas, respectively, in a polarization perpendicular to said perpendicular polarization so as to minimize coupling to said energizing means, said receiving means being responsive to the beat-note between the transmitted and received signals to yield a tone, and a plurality of indicating means actuated by a selected range of tones.

4. A proximity warning indicator comprising first antenna means having horizontal, fan-shaped radiating patterns, second and third antenna means having hemispherical radiation patterns above and below the horizon, frequency-modulated means for energizing said antenna means, first, second, and third receiving means coupled to said first, second, and third antennas, respectively, said receiving means each having a beat-note detector which yields a tone, indicating means actuated by a range of tones translated by said receiving means in correlation to a selected range of proximities, testing means, said testing means including a plurality of channels coupling said energizing means to said receiving means, said plurality of channels yielding delay and attenuation related to the plurality of proximity ranges indicated by said indicating means, said coupling being optionally operative.

5. A radar proximity warning indicator comprising a plurality of first means for radiating electromagnetic energy into selected portions of a sphere, second means for radiating electromagnetic energy into other selected portions of a sphere, frequency-modulated power means for energizing said radiating means, means cyclically coupling said power means to each of said plurality of first radiating means, a plurality of first means for receiving radiant energy in said selected portions of a sphere, a first receiver means, said first radiant energy receiving means being cyclically connected to said first receiver means in synchronism with said cyclic coupling means, second radiant energy receiving means responsive to energy in said other selected portions of a sphere, second receiver means connected to said second radiant energy receiving means, said first and second receiving means each having demodulator means whereby a tone is produced corresponding to a target-echo within said portions of a sphere, a plurality of filter means attached to said first receiver means, a plurality of indicators corresponding to said plurality of first radiating means, said indicators being connected to said plurality of filter means cyclically in synhcronism with said cyclic coupling means, and filter and indicator means coupled to said second receiver means.

6. A radar proximity warning indicator comprising a plurality of first antenna means having fan-shaped quadrantal radiating patterns in a predetermined plane, second and third antenna means having hemispherical radiating patterns directed to either side of said plane, frequency-modulated means for energizing said antenna means in a predetermined polarization, means coupling said frequency-modulated means cyclically to said plurality of first antenna means and directly to said second and third antenna means; first, second, and third receiving means, means coupling said first, second, and third receiving means to said first, second, and third antenna means respectively, said coupling means minimizing leakage energy transfer from said frequency-modulated energizing means to said receiving means, means cyclically connecting said first receiving means to said plurality of first antenna means in synchronism with said cyclic coupling means, each of said receiving means containing detectors yielding tones in accord with the beat-note between said leakage and a signal received by said system, said first receiving means having a plurality of filters tuned to ranges of preselected tones, a plurality of indicating means coupled to the outputs of said filters by energizing relay means, cyclic switching means coupling said indicating means to said relay means in synchronism with said cyclic coupling means, whereby the respective indicator means is energized in accord with the quadrant having a target therein, said second and third receiving means each having filter and relay means therein, each relay means energizing indicator means in accord with predetermined tones received by said second and third receiving means, respectively.

7. A radar proximity warning indicator comprising a plurality of first antenna means having fan-shaped quadrantal radiating patterns in a predetermined plane, second and third antenna means having hemispherical radiating patterns directed to either side of said plane, frequency-modulated means for energizing said antenna means in a predetermined polarization, means coupling said frequency-modulated means cyclically to said plurality of first antenna means and directly to said second and third antenna means; first, second, and third receiving means, means coupling said first, second, and third receiving means to said first, second and third antenna means respectively, said coupling means minimizing leakage energy transfer from said frequency-modulated energizing means to said receiving means, means cyclically connecting said first receiving means to said plurality of first antenna means in synchronism with said cyclic coupling means, each of said receiving means containing detectors yielding tones in accord with the beat-note between said leakage energy and a signal received by said system, said first receiving means having a plurality of filters tuned to preselected tones, a plurality of indicating means coupled to the outputs of said filters by energizing relay means, cyclic switching means coupling said indicating means to said relay means in synchronism with said cyclic coupling means, whereby the respective indicator means is energized in accord with the quadrant having a target therein, said second and third receiving means each having filter and relay means therein, each relay energizing indicator means in accord with a predetermined tones received by said second and third receiving means, respectively, testing means comprising a coupling between said energizing means and each of said receiving means, said coupling containing delay and attenuation means for each selected range of targets corresponding to said range indicated by said indicator means, each coupling yielding a predetermined tone in said receiving means, and means for making said connection at will.

References Cited in the file of this patent
UNITED STATES PATENTS

| | | |
|---|---|---|
| 2,157,122 | Dunmore | May 9, 1939 |
| 2,280,109 | Varela | Apr. 21, 1942 |
| 2,433,681 | Blumlein | Dec. 30, 1947 |
| 2,471,888 | Newbold | May 31, 1949 |
| 2,486,197 | Newbold | Oct. 25, 1949 |
| 2,631,278 | Kiebert | Mar. 10, 1953 |